United States Patent [19]

Beffano

[11] 4,356,997

[45] Nov. 2, 1982

[54] FLOW CONTROL MECHANISM FOR HIGH PRESSURE WELLS

[75] Inventor: John J. Beffano, Houston, Tex.

[73] Assignee: Quality Valve and Machine Works, Inc., Houston, Tex.

[21] Appl. No.: 191,662

[22] Filed: Sep. 29, 1980

[51] Int. Cl.³ .......................................... F16K 47/04
[52] U.S. Cl. ................................ 251/214; 251/121; 251/266; 138/44; 138/45; 277/235 A
[58] Field of Search ............... 251/214, 268, 266, 270, 251/121, 122; 277/117, 235 A, 236, 235 R, 118-122; 138/44, 45

[56] References Cited

U.S. PATENT DOCUMENTS

| | | | |
|---|---|---|---|
| 2,294,499 | 9/1942 | Henkell et al. | 138/44 |
| 2,797,063 | 6/1957 | Hobbs | 251/266 |
| 2,807,511 | 9/1957 | Fleming | 277/335 A |
| 2,893,435 | 7/1959 | Eichenberg | 138/44 |
| 2,950,898 | 8/1960 | Voss | 251/214 |
| 3,186,681 | 6/1965 | Lowrey | 277/117 |
| 3,521,852 | 7/1970 | Gillis, Jr. | 251/121 |
| 3,658,291 | 4/1972 | Meyes | 251/266 |
| 3,690,685 | 9/1972 | Porner et al. | 277/335 A |
| 3,703,814 | 11/1972 | Messerschmidt | 251/214 |
| 3,753,569 | 8/1973 | Bonomi | 277/112 |
| 4,026,517 | 5/1977 | Still | 251/214 |
| 4,047,695 | 9/1973 | Cleveland et al. | 251/122 |
| 4,131,287 | 12/1978 | Gunderson et al. | 277/191 |
| 4,261,584 | 4/1981 | Browne et al. | 277/235 R |

FOREIGN PATENT DOCUMENTS 3563 of 1899 United Kingdom ............... 251/270

Primary Examiner—A. Michael Chambers
Attorney, Agent, or Firm—Gunn, Lee & Jackson

[57] ABSTRACT

A flow control mechanism for high pressure wells comprises a body structure having inlet and outlet passages and adapted for connection to a wellhead in such manner that a metering device meters the flow of production fluid through the inlet and outlet passages. The body structure defines an access opening that is ordinarily maintained closed by a closure element received within the access opening. An annular sealing element is received within an annulus defined between the body structure and the closure element and is formed to define a frusto-conical sealing surface that engages a frusto-conical seat surface defined by the closure element and establishes a high pressure seal between the body structure and closure element. The sealing element is composed of a hard metal such as steel and the sealing surface defined thereby is of slightly differing angle as compared to the angle of the seat surface, thus causing the sealing element to yield radially outwardly upon assembly by virtue of a camming activity to provide a seal both against the seat surface and with respect to the body structure. The sealing element is partially impregnated and coated with a friction-resistant polymer such as polytetrafluoroethylene.

15 Claims, 3 Drawing Figures

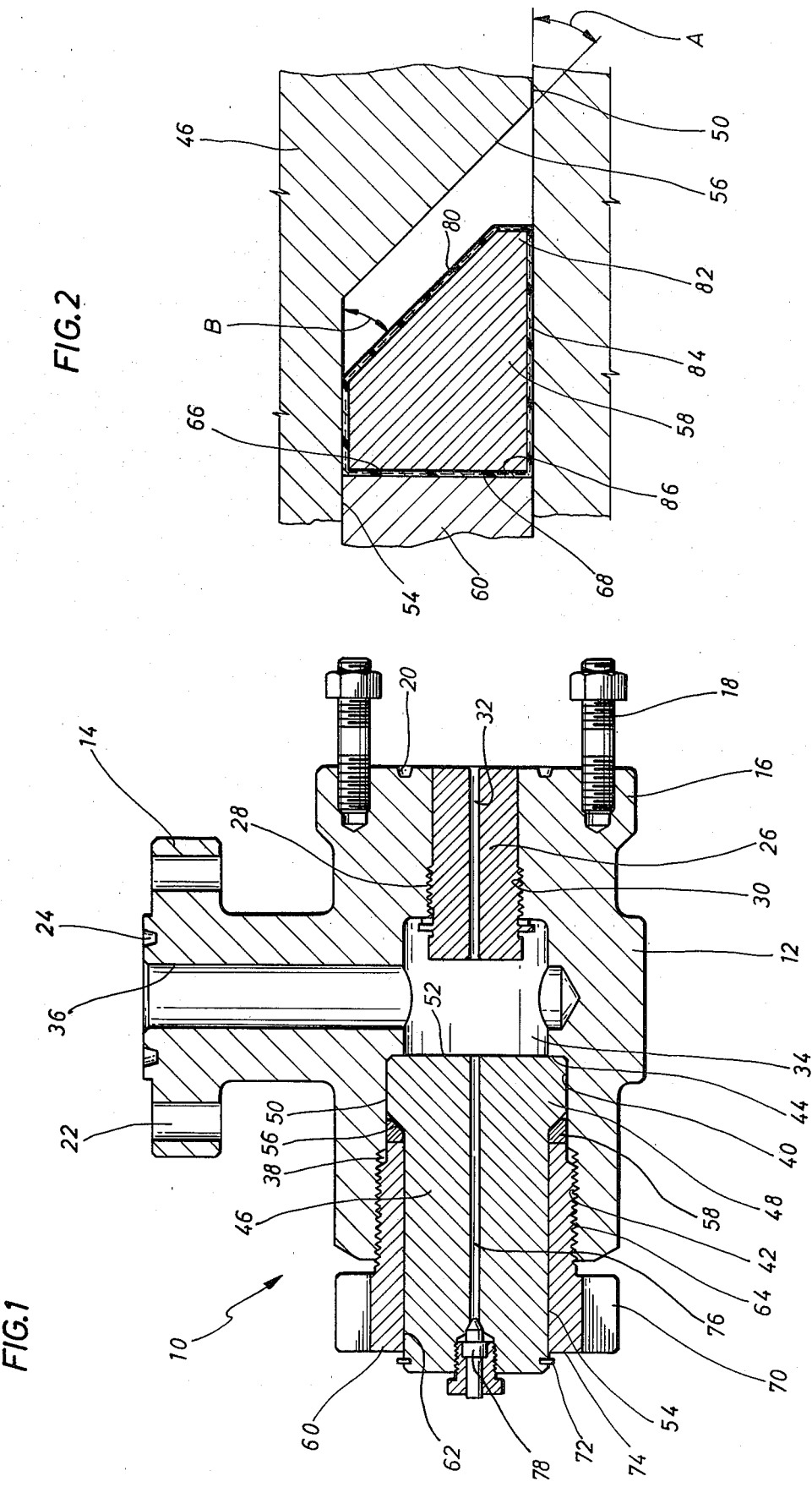

FLOW CONTROL MECHANISM FOR HIGH PRESSURE WELLS

FIELD OF THE INVENTION

This invention relates generally to flow control mechanisms, which are typically referred to in the industry as chokes, and which are employed for the purpose of controlling the rate of flow of production fluid being produced from a high pressure well. More specifically, the present invention is directed to the provision of a novel seal and seat assembly having the capability of providing optimum sealing between a body structure of the choke and a closure element that is received therein.

BACKGROUND OF THE INVENTION

Virtually all wells for production of petroleum products which produce such products from a pressurized production zone utilize flow control mechanisms, typically referred to as chokes, for the purpose of controlling the rate of flow from the production zone through the wellhead flow control apparatus. In some cases, chokes are of adjustable nature and incorporate an internal valve element that may be moved relative to a valve seat in order to adjust the rate of flow as desired. In other circumstances, a positive choke structure is provided wherein an internal flow restriction element of fixed nature is positioned such that flowing production fluid must pass through a restricted opening or passage in order to reach a production conduit. Regardless whether adjustable or fixed choke systems are employed, there is typically provided a choke body structure having an access opening in order that access may be gained to the interior of the choke body during manufacture and repair operations. In the case of adjustable choke mechanisms, a valve actuator typically incorporates the closure element and provides for externally controlled movement of the valve element for the purpose of adjusting the rate of flow. In the case of positive choke mechanisms, the closure element is merely provided for closure of the access opening of the choke body structure.

Under low pressure well service conditions, sealing of the closure structure of both adjustable and positive choke mechanisms is not critical. Many different types of seal mechanisms may be successfully employed to achieve optimum sealing at low pressures. In the case of high pressure conditions, the access opening closure structure of many choke mechanisms may require the provision of metal-to-metal sealing as well as providing elastomeric sealing to enhance the sealing capability of the metal-to-metal seal. For example, U.S. Pat. No. 4,047,695 employs a combination metal-to-metal and resilient seals in order to establish closure sealing in an adjustable type choke mechanism. In many cases the choke body is formed to define an internal frusto-conical seat surface that is adapted to be engaged by an external frusto-conical seal surface that is defined on the closure element. A closure retainer structure or bonnet is then threaded downwardly onto the body structure to accomplish forcing of the sealing surface into positive fluid-tight sealing engagement with respect to the seat surface. An example of a choke mechanism of this nature is the type "CH-2" choke mechanism that is manufactured by the McEvoy Company and which is set forth on page 4117 of the composite catalog of Oil Field Equipment & Services of 1976–1977, published by World Oil, Gulf Publishing Company, Houston, Texas.

In many cases, metal sealing rings have been employed in choke mechanisms and other wellhead structures to provide a sealing capability. Examples of metal ring type seals are identified by U.S. Pat. Nos. 3,104,121 of Nordin et al and 3,166,345 of Pinkard. Metal ring-type high pressure seals are also identified in U.S. Pat Nos. 3,927,891 of Larker et al and 4,079,948 of Paureau. In some cases, metal sealing elements for high pressure sealing are yieldable to some extent as identified by U.S. Pat. Nos. 3,468,566 of Neitzel; 3,490,777 of Emmerson; 3,690,682 of Ferrill; and 4,131,287 of Gunderson et al.

SUMMARY OF THE INVENTION

It is a primary object of this invention to provide a novel flow control mechanism for high pressure well service wherein the flow control mechanism may be of adjustable or fixed nature and wherein an efficient closure seal mechanism is provided which has efficient sealing capability even under extremely high pressure conditions.

It is also a feature of this invention to provide a novel flow control mechanism for high pressure wells wherein an annular metal sealing ring is employed and which is slightly deformable under conditions of high mechanical force to establish efficient sealing of a flow control closure with respect to a flow control body structure.

It is another important feature of this invention to provide a novel flow control mechanism for high pressure wells wherein a high pressure seal assembly is employed having frusto-conical sealing surfaces of slightly differing angular characteristics which create a camming activity under conditions of high mechanical load so as to yield the annular sealing element and accomplish sealing engagement both with a flow control closure element and with a body structure surrounding the seal.

It is an even further feature of this invention to provide a novel seal construction for developing an efficient seal under high pressure conditions and which seal incorporates a coating of a polymer material which is at least partially impregnated within the metal structure thereof to enhance the sealing capability of the seal element.

Other and further objects, advantages and features of this invention will become obvious to one skilled in the art upon an understanding of the illustrative embodiment about to be described and various advantages, not referred to herein, will occur to one skilled in the art upon employment of the invention in practice.

Briefly, the present invention is directed to the provision of a flow control mechanism or choke which is designed particularly for high pressure well service. The invention is capable of utilization both under circumstances where the choke mechanism is of adjustable nature to provide for adjustable flow rate control or is of fixed nature wherein the rate of flow is determined by a fixed orifice. The choke mechanism in either case incorporates a body structure which defines the usual inlet and outlet passage system in communication with a body cavity. To provide for access to the interior of the choke body structure, the body is formed to define an access passage with appropriate closure means to maintain the access passage closed during all phases of operation. In the case of adjustable choke mechanisms, the closure element is defined by the body portion of a valve actuator mechanism that is utilized to adjust the position of a valve element relative to a valve seat defined by the flow restrictor or "bean." In the case of a fixed choke mechanism, the flow of fluid through the choke is controlled by a fixed orifice passage formed in a flow restrictor element or bean while the closure element provides only the function of closing the access opening during use. In either case, the closure element is formed externally to define a frusto-conical seat surface which is capable of being engaged by a frusto-conical sealing surface of an annular metal seal ring that is retained in tight mechanical engagement with respect to the seal ring by means of a suitable seal retainer element. To enhance the sealing capability of the seal ring, the angle of the sealing surface of the seal ring slightly differs from the angle of the seat surface of the closure element. When the seal ring is brought into engagement with the seat surface, initial contact occurs at the radially outer portion of the seat surface and seal ring. The seal ring, although being composed of relatively rigid material, such as steel, is nevertheless slightly yieldable under high mechanical force, thus enabling the sealing surface and seat surface to be forced into substantially complete mating and sealing relation. To further enhance the sealing capability of the seal ring, it is provided with a coating of a friction-resistant polymer, such as polytetrafluoroethylene, which at least partially impregnates the outer surface portion of the metal sealing element.

BRIEF DESCRIPTION OF THE DRAWINGS

In order that the manner in which the above recited advantages and objects of this invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and therefore are not to be considered limiting of its scope, for the invention may admit to other equally effective embodiments.

Figure 3:
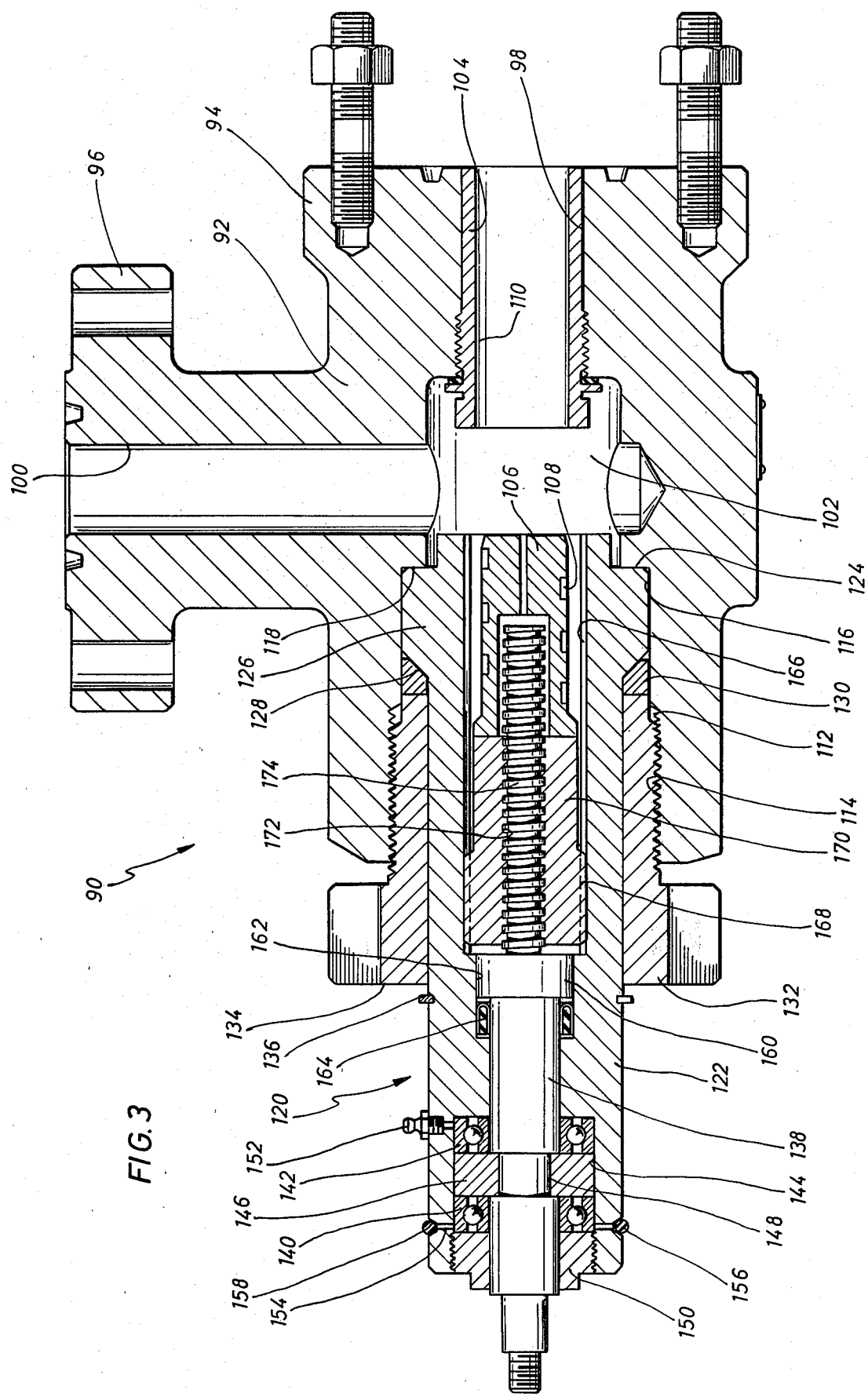

IN THE DRAWINGS:

FIG. 1 is a sectional view of a flow control mechanism for high pressure well service which is manufactured in accordance with the present invention and which incorporates a fixed flow restrictor for accomplishing metering of the high pressure fluid flowing through the flow control mechanism.

FIG. 2 is a fragmentary sectional view of the flow control mechanism of FIG. 1, illustrating the closure seal mechanism thereof in detail and with the annular sealing ring shown in spaced relation with respect to a frusto-conical seat surface defined by the closure element.

FIG. 3 is a sectional view of an adjustable flow control mechanism which is also constructed in accordance with the present invention and utilizes a closure seal assembly such as that illustrated in FIG. 1.

DETAILED DESCRIPTION OF PREFERRED EMBODIMENT

Referring now to the drawings, and first to FIG. 1, there is shown a flow control mechanism generally at 10 which is adapted for high pressure well service conditions. The flow control mechanism, which is also typically referred to as a "choke mechanism," includes a choke body structure 12 defining connection flanges 14 and 16 that enable the body structure 12 to be placed in bolted connection with respect to wellhead and flow line structure. For example, a plurality of stud elements 18 may be employed to secure the body flange 16 in connection with a wellhead assembly with sealing therebetween being maintained by means of an appropriate seal element positioned within an annular seal groove 20 defined in the body structure 12 and a corresponding seal groove defined in the wellhead flange structure. Likewise, the bolt flange 14 defines a plurality of bolt openings 22 within which may be received bolts or studs in order to secure the flange 14 with respect to a corresponding flange of a flow line that conducts produced well fluid to any suitable facility for handling thereof. The bolt flange structure 14 is of conventional nature and defines an annular seal groove 24 that cooperates with a corresponding seal groove of a flow line flange, wing valve or the like and receives an annular sealing element for maintenance of a seal therebetween.

The choke mechanism illustrated generally at 10 is of fixed flow characteristics and incorporates a flow restrictor element or bean 26 having an externally threaded portion 28 that is received in threaded engagement by internal threads 30 defined within the body structure 12. The flow bean 26 is also formed to define a restricted passage 32 through which production fluid from the wellhead flows as it is produced. The size of the restricted passage 32 may vary, depending upon the particular flow characteristics. After passing through the restricted passage 32 of the flow bean 26, the produced fluid then exits from the body cavity 34 by way of the outlet passage 36 and the produced fluid is then conducted through a conventional flow line to a suitable receiver therefor.

The body structure 12 is also formed to define an access passage 38 including an inner, generally cylindrical portion 40 an an outer, internally threaded portion 42. The cylindrical access passage section 40 intersects the body chamber 34 in such manner as to define an annular support shoulder 44.

In order to close the access passage 38, a closure member 46 is provided which is formed at the inner extremity thereof so as to define an enlargement 48 having a cylindrical surface portion 50 that has a close-fitting relation with respect to the internal cylindrical surface portion 40 of the access passage 38. A lower surface portion 52 of the closure element 46 is adapted to seat against the annular support shoulder 44 of the body structure 12 when the closure element 46 is properly seated within the access passage 38.

It is desirable to provide an efficient seal between the closure element 46 and the access passage 38 of the body structure 12, which seal has the capability of efficient sealing even under extremely high pressure conditions. In accordance with the present invention, a high pressure closure seal assembly may conveniently take the form illustrated in the various figures of the drawings and shown in enlarged detail in FIG. 2. As shown in the various figures, the closure element 46 defines an outer generally cylindrical portion 54 that cooperates with the access passage 38 to define an annulus. The closure element 46 is also formed to define a frusto-conical seat surface 56 which transitions between the cylindrical surfaces 50 and 54. An annular seal ring 58 is received within the annulus and is adapted to establish sealing engagement with respect to the frusto-conical seat surface 56 and to further establish sealing engagement with respect to the inner cylindrical surface portion 40 of the access passage 38. The specific structure of the annular seal element 58 is discussed in detail hereinbelow in connection with FIG. 2.

To retain the annular sealing element 58 in proper sealing relationship within the annulus, the choke mechanism is provided with an annular retainer element 60 that is formed to define an internal bore 62 that is receivable in relatively close-fitting engagement with respect to the outer cylindrical portion 54 of the closure element 46. The retainer element 60 is also formed to define an inner externally threaded portion 64 that is receivable in threaded engagement by the internally threaded portion 42 of the access passage 38. The retainer element 60 is also formed at the inner extremity thereof to define an annular abutment shoulder 66 which is adapted to bear against an annular force-transmitting surface 68 that is defined by the annular sealing element 58. The retainer element is further formed to define a plurality of external striker projections 70 which enable service personnel to tighten or loosen the retainer element relative to the choke body structure by directionally controlled striking of the projections. This feature enables service personnel to remove the closure element 46 in the field in the event servicing of the choke mechanism is desired.

A retainer ring 72, such as a snap ring, is retained within an outer annular groove formed in the closure element 46. The retainer ring 72 provides the closure element 46 with the capability of being forcibly extracted from the access passage 38 in the event that mere loosening of the retainer element 60 should fail to completely loosen the closure element and allow removal of it by manual handling. As the retainer element 60 is unthreaded from the internal threaded portion 42 of the body structure 12, the outer surface portion 74 thereof will contact the retainer ring 72, thus allowing the retainer element 60 to induce an outwardly directed force to the closure element 46 for efficient removal of the closure element from the access passage.

To ensure the safety of service personnel, the closure element 46 is formed to define a bleed passage 76 that is closed by means of a bleed control valve 78. To ensure that the body chamber 34 has been depressurized or to vent pressure from the body chamber to the atmosphere, the bleed valve 78 may be opened as desired. This feature ensures that the closure element 46 will not be blown from the body structure 12 upon releasing the threaded connection of the retainer element 60 with respect to the body structure.

Referring now particularly to FIG. 2, it is pointed out that the frusto-conical seat surface 56 defines an angle A which is slightly different as compared to angle B which is defined by a frusto-conical sealing surface 80 that is formed by the annular sealing element 58. Moreover, the angles A and B defined, respectively, by surfaces 56 and 80 differ in such manner that initial engagement between the surfaces 56 and 80 occur at the radially outer portions thereof. For example, in one suitable form of the invention, the included angle B of the frusto-conical sealing surface 80 is 45° while angle A defined by frusto-conical sealing surface 56 is 44° 30'. As the sealing surface 80 moves into engagement with seat surface 56, initial contact is substantially in the form of a circular line. Due to the configuration of the relatively narrow annular rim portion 82 of the sealing element 58, the rim portion 82 has a tendency to yield radially outwardly due to an essentially camming relationship that develops between the surfaces 56 and 80. This radial yielding movement of the sealing element 58 causes an outer generally cylindrical surface portion 84 thereof to be urged into tight sealing engagement with respect to the inner cylindrical surface 40 of the access passage 38. As the lower end portion 86 of the retainer element 60 is forced into high mechanical loading contact with the abutment surface 68 of the sealing element 58, the sealing element, although being composed of a relatively hard metal, will be yielded radially outwardly to such extent that a substantially full mating engagement will be developed between the sealing surface 80 and the seat surface 56. This mechanical engagement is sufficient to develop an efficient sealed relationship between the sealing element and closure element as well as developing an efficient high pressure seal between the sealing element and the cylindrical wall structure 40 of the body 12.

The sealing element 52 is provided with a coating of a polymer resin such as polytetrafluoroethylene which is at least partially impregnated into the surfaces of the sealing element. The sealing element may be composed of 10/10 steel or 10/20 steel having a hardness range in the order of 120 maximum brinnel. Polytetrafluoroethylene is applied under extremely high pressure to the sealing element to accomplish partial impregnation of the polytetrafluoroethylene into the metal sealing element. The presence of polytetrafluoroethylene or other similar flow friction polymer material effectively prevents the sealing element 58 from seizing with respect to either of the metal surfaces engaged thereby. Further, the polymer coating also assists to a desirable degree in enhancing the sealing capability of the sealing element relative to the surfaces engaged thereby.

With reference now to FIG. 3, there is illustrated an adjustable coke mechanism shown generally at 90 which incorporates the same sealing characteristics as compared to the fixed choke mechanism illustrated in FIG. 1. The choke mechanism 90 incorporates a body structure 92 defining connection flanges 94 and 96 for connection of the choke mechanism to appropriate flanged structure of a well-head assembly and flow line assembly in the manner discussed above. The body structure 92 is formed to define inlet and outlet passages 98 and 100, respectively, there are in intersecting relation with a body cavity 102. A choke or restrictor element 104 is received in threaded engagement within the inlet passage 98 and is adapted to receive a restrictor valve element 106 therein. The valve element is formed to define a grooved external structure such as shown at 108 which cooperates with an internal surface 110 defined by the restrictor element 104 to form a metering passage through which production fluid is metered from the wellhead assembly into the body cavity 102 of the choke mechanism.

The body structure 92 is formed to define a closure passage 112 having an outer internally threaded portion 114 and an internal cylindrical surface portion 116. The closure passage 112 intersects with the body cavity 102 in such manner as to define an annular support shoulder 118.

The flow control valve element 106 is movable within the choke mechanism by a valve actuator assembly illustrated generally at 120. The valve actuator assembly incorporates an actuator body structure 122 that is retained in sealed assembly with the choke body structure 92 in the same manner as the closure element 46 is so retained as shown and described in connection with FIG. 1. The actuator body defines an annular shoulder surface 124 which is adapted for seating engagement with respect to the support surface 118. The enlarged lower portion 126 of the actuator body 122 fits closely with respect to the annular internal surface 116 of the closure passage and also forms a frusto-conical seat surface 128 which corresponds to the frusto-conical seat surface 56 illustrated in FIGS. 1 and 2. Likewise, an annular coated metal ring type sealing element 130 is positioned within an annulus defined between the actuator body and the closure passage and takes the form and character essentially as shown at 58 and described above in connection with FIGS. 1 and 2. A retainer element 132, which may be substantially identical with retainer element 60 of FIG. 1, is threadedly received within the internally threaded portion 114 of the closure passage. Retainer element 132 may be manipulated in the manner described above to apply sufficient mechanical force to the annular sealing element 130 to cause yielding thereof and to induce the development of an optimum sealing relation between the sealing element and the respective surfaces engaged thereby. The actuator body structure 122 may be removed from the choke body 92 by unthreading the threaded connection 114 and by causing an outer abutment surface portion 134 of the retainer element to engage a force-transmitting retainer ring 136 in the manner described above in connection with retainer ring 72.

The valve actuator mechanism 120 incorporates a valve actuator stem 138 which is rotatably supported within the actuator body 122 by means of suitable bearing elements 140 and 142 which are retained within a bearing chamber 144 defined within the outer portion of the valve actuator body 122. A split thrust-transmitting member 146 is also receivable within the bearing chamber 144 and extends into an annular groove 148 defined in the actuator stem 138. As the actuator stem 138 is rotated in either direction, forces induced linearly thereto are transmitted by the thrust member 146 to respective ones of the thrust bearings 140 and 142. A bearing retainer element 150 is provided to retain the bearings and thrust member within the bearing chamber. A lubricant fitting 152 is assembled with the actuator body 122 and is in communication with the bearing chamber 144 by means of a lubricant passage. To prevent excessive build-up of lubricant pressure within the bearing chamber 144, a plurality of vent passages 154 communicate with the bearing chamber and a resilient sealing element 156 that is retained within an annular external groove 158 provides a yieldable closure for the lubricant vent passages to prevent dust and other debris from entering the bearing chamber. Upon introduction of lubricant through lubricant fitting 152 into the chamber 144, excessive lubricant will be vented through passages 154, thus providing operating personnel with an indication that the bearings are properly lubricated.

At an intermediate portion of the actuator stem 138, a stem enlargement 160 is provided which cooperates with an internal bore 162 to define a packing chamber within which a packing element 164 is suitably retained to prevent leakage along the actuator stem 138.

In order to achieve linear movement of the valve element 106 upon rotary movement of the actuator stem 138, the actuator body 122 is formed internally to define a plurality of elongated generally parallel guide grooves 166 within which are received valve guide elements 168 that are defined externally of a valve support member 170. The valve support member is formed to define an internally threaded bore 172 that is adapted to receive an externally threaded actuator stem portion 174. The valve element 106 is composed of a wear-resistant material of any suitable character and is interconnected with the valve support member 170 by any suitable means. Upon rotation of the actuator stem 138, the valve support element 170 is moved linearly by virtue of the nonrotatable relation thereof which is established by the interfitting relation of the guide elements 168 within the elongated grooves 166. Thus, the valve element 106 is caused to move relative to the flow restrictor element 104 and may be positioned within the flow restrictor element in such manner that the external grooves 108 define an efficient restricted passage means to enable the production fluid flowing through the choke mechanism to be effectively metered.

In view of the foregoing, it is clear that I have developed a novel flow control mechanism for high pressure well service where an effective high pressure sealing assembly is employed to accomplish an efficient seal between a choke body structure and an access closure element. The seal assembly so developed, may be efficiently utilized regardless of whether the choke mechanism is of fixed or adjustable nature.

It is therefore apparent that the pressure invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

I claim:

1. A flow control choke mechanism for high pressure well service, said flow control mechanism comprising:
    a body strucure defining intersecting inlet and outlet flow passage means and an access opening in substantial alignment with said inlet passage means, said body structure being adapted for connection in flow controlling relation with a wellhead assembly;
    a flow bean being positioned within said inlet passage means and defining a restricted passage through which production fluid flows;
    a closure element being positioned within said access opening of said body structure and having an enlarged inner extremity defining an external frusto-conical seat surface facing outwardly;
    an annular metal seal element being received within said body structure and positioned about said closure element, said metal seal element having a maximum hardness of 120 brinnel and being formed to define an internal frusto-conical sealing surface facing inwardly and being of differing angle as compared to the angle of said external frusto-conical sealing surface of said closure element, said metal seal element also being formed to define an annular abutment surface, the radially outer portion of said internal frusto-conical surface establishing line contact with said external fruso-conical surface upon initial engagement and said seal element being deformable upon high mechanical loading to establish surface contact between said internal and external frusto-conical surfaces and between said seal element and said body structure;

a retainer element being at least partially positioned within said body and being positioned about said closure element, said retainer element defining an annular shoulder that engages said abutment surface of said seal element; and means securing said retainer element against said abutment surface of said seal element with sufficient force to induce radial yielding of said seal element and establish substantially full surface sealing engagement between said seat surface and sealing surface and establish sealing engagement between the outer portion of said seal element and said body structure.

2. A flow control choke mechanism as recited in claim 1, wherein:
said annular seal element is provided with a coating of resin material.

3. A flow control choke mechanism as recited in claim 2, wherein:
said coating is formed at least partially of polytetrafluoroethylene.

4. A flow control choke mechanism as recited in claim 3, wherein:
said polytetrafluoroethylene is at least partially impregnated into the outer surfaces of said annular seal element.

5. A flow control choke mechanism as recited in claim 1, wherein:
the angle of said internal frusto-conical surface differs from the angle of said external frusto-conical surface by an amount less than 5°.

6. A flow control choke mechanism as recited in claim 5, wherein:
the angle of said internal frusto-conical surface is 45° and the angle of said external frusto-conical surface is 44° 30′.

7. A flow control choke mechanism as recited in claim 1, wherein:
said seal element is composed of steel.

8. A flow control choke mechanism as recited in claim 1, wherein:
said means forcing said retainer element against said abutment surface of said seal element is defined by threaded engagement of said retainer element within said body structure.

9. A flow control choke mechanism for controlling the flow of production fluid from high pressure wells, said flow control mechanism comprising:
a body strucure adapted for interconnection with a wellhead assembly and being formed to define a body cavity with inlet and outlet passage means in fluid communication with said body cavity and being an intersecting angular relation, said body structure being further formed to define access passage means in communication with said body cavity and being in alignment with said inlet passage means, said body structure further defining an internal annular support shoulder;

fixed fluid metering means being positioned within said inlet passage means and being operative to meter the flow of production fluid through said outlet passage means;

closure means being received within said access passage means, said closure means defining an external frusto-conical seat surface facing outwardly away from said body cavity and defining a seal annulus with said access passage means;

an annular metal seal element being received within said seal annulus about said closure means and being formed to define a frusto-conical sealing surface of differing angle as compared to the angle of said seat surface, the radially outer portion of said sealing surface establishing initial contact with the radially outer portion of said seat surface upon assembly, said seal element being yieldable radially outwardly by said seat surface; a seal retainer element being received by said body structure and having at least a portion thereof extending into said access passage and engaging said annular metal seal element; and said body strucure and seal retainer element having cooperative thread means forcing said retainer element against said annular seal element with a force of sufficient magnitude to cause said radial yielding of said seal element and bringing said sealing surface into substantially full engagement with said seat surface.

10. A flow control choke mechanism as recited in claim 9, wherein:
said annular seal element is provided with a coating of resin material.

11. A flow control choke mechanism as recited in claim 9, wherein:
said coating is formed at least partially of polytetrafluoroethylene.

12. A flow control choke mechanism as recited in claim 11, wherein:
said polytetrafluoroethylene is at least partially impregnated into the outer surface of said annular seal element.

13. A flow control choke mechanism as recited in claim 9, wherein:
the angle of said internal frusto-conical surface differs from the angle of said external frusto-conical surface by an amount less than 5°.

14. A flow control choke mechanism as recited in claim 13, wherein:
the angle of said internal frusto-conical surface is 45° and the angle of said external frusto-conical surface is 44° 30′.

15. A flow control choke mechanism as recited in claim 9, wherein:
said seal element is composed of steel.

* * * * *